Patented July 15, 1952

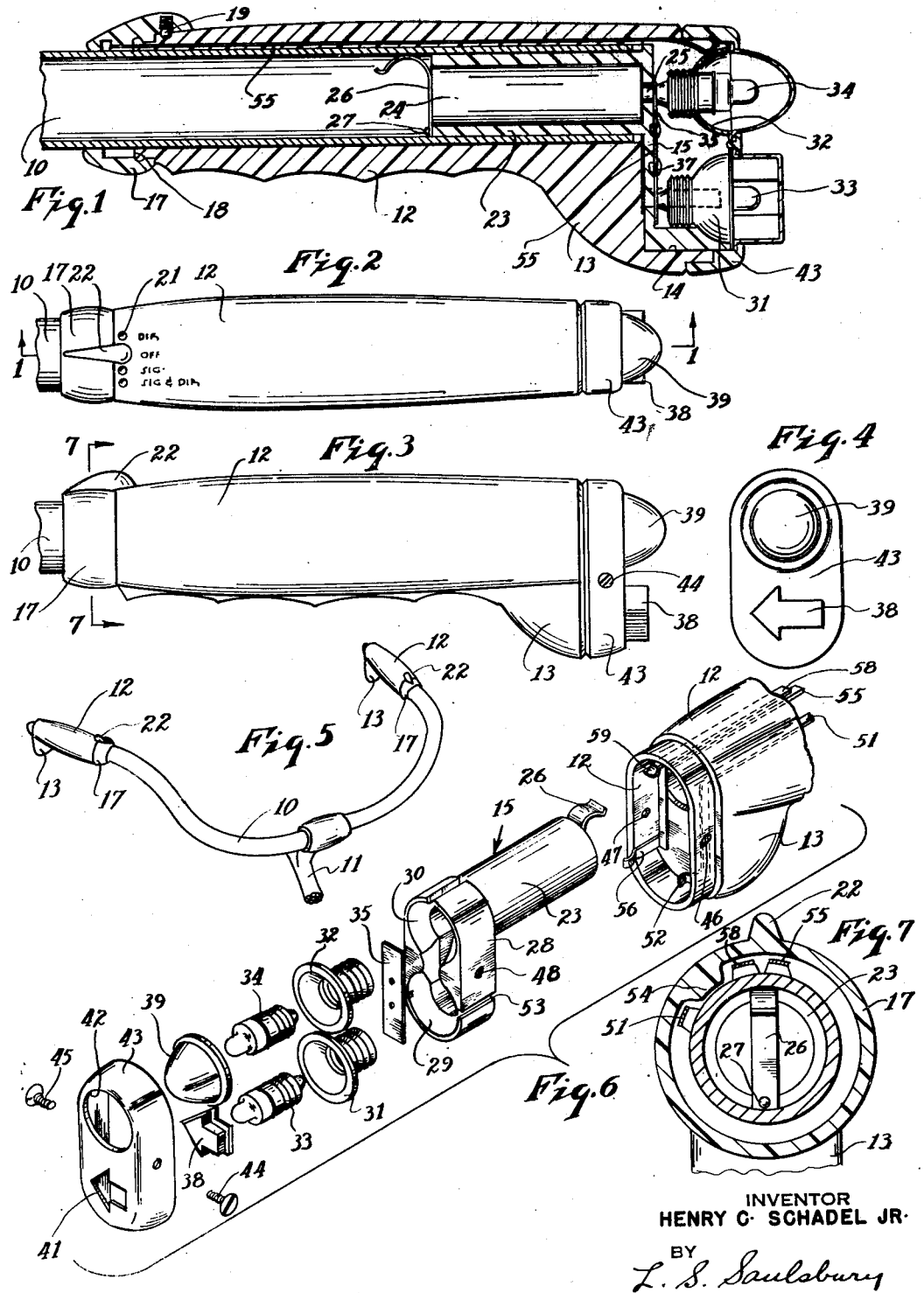

2,603,701

UNITED STATES PATENT OFFICE 2,603,701

SIGNAL LIGHT FOR BICYCLE HANDLE BARS

Henry C. Schadel, Jr., Corona, N. Y.

Application February 23, 1951, Serial No. 212,262

2 Claims. (Cl. 177—329)

This invention relates to a handle bar signal light.

It is an object of the present invention to present in a handle bar grip a signal light to indicate the presence of the bicycle on the highway or to serve as a stop light and also to give an indication of a directional turn of the bicycle upon the road, and wherein a directional signal can be used independently of the stop or night signal as in the daytime.

It is another object of the invention to provide an assembly of a light arrangement within the end of a handle bar wherein the battery is a part of the light arrangement and will be in that part thereof that projects into the handle bar metal where it can be grounded thereupon and wherein the handle bar grip encompasses the light arrangement at its outer end and has a switch operating member journalled thereon and easily accessible to the thumb of the hand to turn on and off the light signals.

Other objects of the invention are to provide a handle bar signal light assembly which is of simple construction, inexpensive to manufacture, has a minimum number of parts, compact, easy to assemble on the handle bar, durable, comfortable and easy to grip, of pleasing appearance and efficient in operation.

For other objects and a better understanding of the invention reference may be had to the following detailed description, taken in connection with the accompanying drawing, in which:

Fig. 1 is an enlarged longitudinal sectional view taken through the end of the handle bar and through the hand grip signal light assembly employing the features of the present invention, the view being taken generally on line 1—1 of Fig. 2.

Fig. 2 is a top planed view of the combined grip and signal light assembly.

Fig. 3 is a side elevational view of the assembly.

Fig. 4 is a rear elevational view.

Fig. 5 is a perspective view of a handle bar employing the combined grip and light assemblies on the opposite ends thereof.

Fig. 6 is an exploded view with the parts shown in perspective and extended from the rear end of the hand grip member.

Fig. 7 is an enlarged transverse sectional view taken on line 7—7 of Fig. 3.

Referring now to the figures, 10 represents handle bars which are secured to a post 11, Fig. 5. These handle bars are made of pipe stock and are open at their ends. The handle bars are of metal and provide a ground connection.

Adapted to fit the end of the handle bar is a grip 12 of insulating material which has an enlargement 13 at its rear end and a recess 14 into which a light and battery assembly, indicated generally at 15, may be inserted.

On the forward end of the hand grip 12, there is mounted a switch operating member 17. An enlargement 18 retains this member upon the hand grip 12 against axial displacement therefrom. A detent ball 19 enters depressions 21 on the outer surface of the grip member 12 to hold the switch operating member 17 in its adjusted position. The switch operating member has a raised portion 22 which can be readily and easily engaged by the thumb, when it is desired to move the switch member 17 to the different positions.

The light and battery assembly 15 includes a sleeve portion 23 which houses a battery 24, having a positive terminal 25. A groundstrip 26 is secured to the outer end of the sleeve 23 by a rivet 27 and is curved at its upper end to engage with the inner surface of the handle bar 10 to establish a ground connection therewith.

The light and battery assembly has an enlarged portion 28 with vertically spaced openings 29 and 30 for receiving respectively reflectors 31 and 32 threaded to respectively receive the screw lamps 33 and 34. Extending between the openings 29 and 30 is a positive contact strip 35 which is engaged by the positive terminals of the screw lamps 33 and 34 to bridge the same. The upper end of the contact strip 35 will engage the positive terminal 25 of the battery 24, Fig. 1. Contact strip 35 is held in place within the body 15 and in the bottom of the enlarged portion 28 by pins 37. Over the lamp bulbs 33 and 34 there may be disposed respectively a directional arrow lens 38 and a round lens 39 which project respectively through openings 41 and 42 in a retaining cap 43 which is secured upon the enlarged end 13 of the hand grip 12 by screws 44 and 45 which enter the opposite sides of the cap 43 and engage respectively with openings 46 and 47 of the hand grip 12 and respectively with openings 48 on the respective sides of the portion 28 of the light and battery body 15. In this manner the entire assembly is retained in the end of the hand grip 12.

Embedded in the hand grip 12 and extending from one end thereof to the other is a conductor 51 having a contact portion 52 which extends in a slot 53 in the side of the portion 28 of the battery and lamp bulb body 15, Fig. 6, to engage the reflector 31, thereby to establish a circuit through the lamp bulb 33 and the switch 17 as the switch member is rotated to the right as viewed in Fig. 2 so that the ball detent 19 engages with a depression bearing the legend "Dir." This movement of the switch operating member 17 will have been made from the "off" position. The rotatable member 17 has an inwardly extending projection 54, which will ride over the conductor 51 to depress the same downwardly and into engagement with the metal handle bars, whereby to complete the ground circuit of battery and cause the directional light 33 to be turned on.

A second conductor 55 extends through the hand grip body 12 and has a contact projection 56 thereon for the reflector 31. As the switch operating member 17 is turned to the left as shown in Fig. 2 to depress the forward end of the conductor 55 the lamp bulb 33 will be turned on to display the direction signal. The operating member 17 is thereby turned to the left so that the ball detent engages with the depression in the top of the hand grip 12 which bears the legend "Sig. and Dir."

In order that the signal lamp 34 can be turned on, independently, a conductor 58 extends through the grip body and has a portion 59 for engagement with the reflector 32. When this conductor is caused to engage, the handle bar pipe 10, the signal lamp bulb 34 will be lighted. The ball detent 19 will lie in the depression in the top of the body 12 as indicated by the legend "Sig." The regularly inwardly extending portion 54 of the operating member 17 is used to depress the several conductors 51, 55 and 58.

During the daytime the operating member will be moved to either turn on the directional lamp bulb 33 or will turned in the opposite direction to turn on the signal lamp bulb 34. The projection 54 is sufficiently wide so that it can bridge the two conductors 55 and 58 to turn on simultaneously both lamp bulbs 33 and 34, or it can be moved from one conductor to the other as will be seen in Fig. 7.

The assembly can be easily fitted upon the hollow end of the handle bar. The battery and lamp unit can easily be removed from the hand grip member by the removal of the cap 43. It will be apparent that with the assembly upon the handle bar and by a mere turning of the switch operating member 17 the lamps 34 and 35 can be turned on either singly or together as when the projection 54 of the switch operating member 17 bridges the two conductors 55 and 58.

While various changes may be made in the detail construction, it shall be understood that such changes shall be within the spirit and scope of the present invention as defined by the appended claims.

What is claimed is:

1. A handle bar signal light device comprising a bar grip tube adapted to fit a handle bar end, a combined light and battery assembly having a sleeve portion with a battery therein, said sleeve portion adapted to enter the hollow end of the handle bar upon the grip tube being fitted thereon, electrical conductors extending through the grip tube, lamp elements with reflectors thereon, carried by the combined lamp and battery assembly, said conductors engageable respectively with the reflectors of the lamps in the combined lamp and battery assembly, a rotatable switch member on the forward end of the bar grip tube and engageable with the electrical conductors as the same is rotated to selectively and operatively depress the conductors onto the handle bar to establish a ground connection therewith, a ground terminal connected to the battery and engaging with the handle bar.

2. A handle bar signal light device comprising a bar grip tube adapted to fit a handle bar end, a combined light and battery assembly having a sleeve portion with a battery therein, said sleeve portion adapted to enter the hollow end of the handle bar upon the grip tube being fitted thereon, electrical conductors extending through the grip tube, lamp elements with reflectors thereon, carried by the combined lamp and battery assembly, said conductors engageable respectively with the reflectors of the lamps in the combined lamp and battery assembly a rotatable switch member on the forward end of the bar grip tube and engageable with the electrical conductors as the same is rotated to selectively and operatively depress the conductors onto the handle bar to establish a ground connection therewith, a ground terminal connected to the battery and engaging with the handle bar, said hand grip tube having an enlargement thereon, said battery and lamp assembly having an enlargement and adapted to fit within the enlargement of the hand grip tube, said lamp elements being vertically spaced with respect to one another, an end cap having openings therein, lenses extending through the openings, said end cap being adapted to fit the enlargement on the hand grip tube and screw means penetrating the enlargement of the hand grip member and the enlargement of the combined battery and light assembly, upon the securement of the end cap therewith, thereby to unify the end cap, the hand grip tube and the battery and lamp assembly.

HENRY C. SCHADEL, Jr.

REFERENCES CITED

The following references are of record in the file of this patent:

UNITED STATES PATENTS

| Number | Name | Date |
|---|---|---|
| 1,847,115 | Kummerle et al. | Mar. 7, 1932 |
| 2,416,160 | Davidson | Feb. 18, 1947 |
| 2,469,944 | Bauters | May 10, 1949 |